United States Patent [19]
Fohl et al.

[11] 4,158,493
[45] Jun. 19, 1979

[54] FLASH LAMP ASSEMBLY HAVING HEAT-RESPONSIVE INDEXING MEMBERS

[75] Inventors: Timothy Fohl, Carlisle; William E. Hatch, Marblehead, both of Mass.

[73] Assignee: GTE Sylvania Incorporated, Stamford, Conn.

[21] Appl. No.: 883,453

[22] Filed: Mar. 6, 1978

[51] Int. Cl.² .................. G03B 15/03; G03B 15/02
[52] U.S. Cl. ........................ 354/144; 362/6; 362/15
[58] Field of Search ............... 354/143, 144, 148; 362/3, 6, 11–18

[56] References Cited

U.S. PATENT DOCUMENTS

| | | | |
|---|---|---|---|
| 3,238,749 | 3/1966 | Reiber et al. | 362/13 X |
| 3,263,068 | 7/1966 | Jakob | 362/15 |
| 3,452,660 | 7/1969 | Schultz et al. | 354/148 |
| 3,535,063 | 10/1970 | Anderson et al. | 431/93 |
| 3,597,604 | 8/1971 | Shaffer | 431/92 X |
| 3,728,069 | 4/1973 | Burke | 354/143 X |

FOREIGN PATENT DOCUMENTS 1555495  12/1968  France ..................... 362/15

Primary Examiner—Donald A. Griffin
Attorney, Agent, or Firm—Lawrence R. Fraley

[57] ABSTRACT

An elongated flash lamp assembly which is sequentially advanced through a camera to permit each of the lamps within the assembly to become aligned with the camera's fixed reflector. Several heat-responsive (e.g. fusible) covers are located on the assembly's housing to permit the above advancement only after each cover has become physically deformed by the heat from the respective flash lamp located adjacent thereto. A mechanism for advancing the assembly is also disclosed.

16 Claims, 6 Drawing Figures

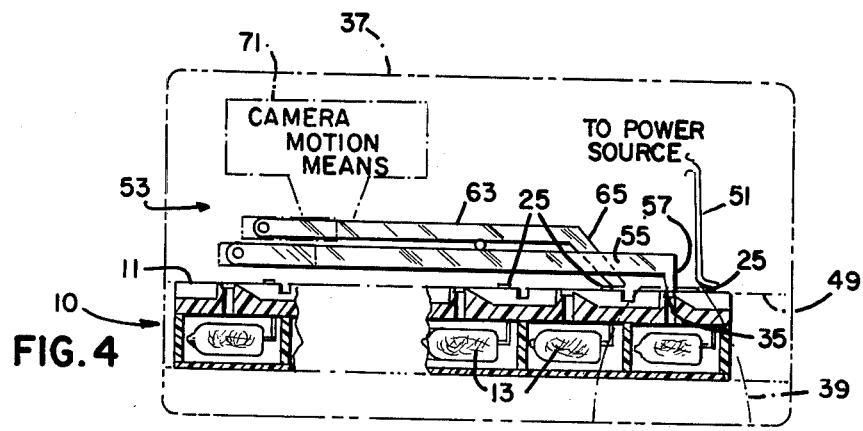
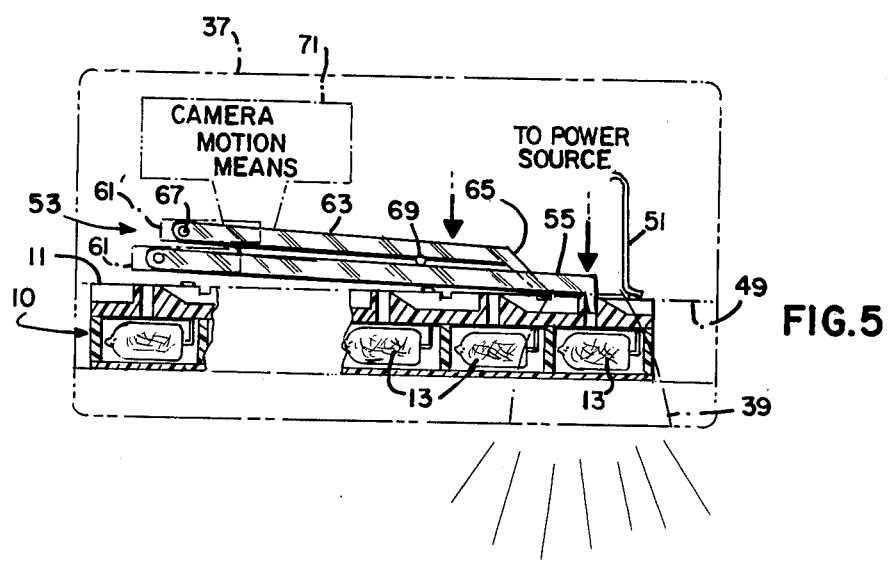
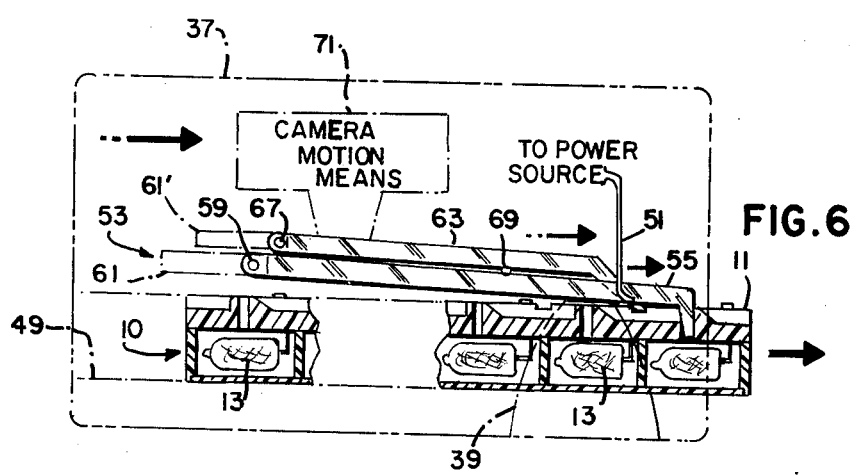

FLASH LAMP ASSEMBLY HAVING HEAT-RESPONSIVE INDEXING MEMBERS

BACKGROUND OF THE INVENTION

The present invention relates to flash lamp assemblies and particularly to flash lamp assemblies for use with photographic cameras. Even more particularly, the invention relates to flash lamp assemblies which are capable of being sequentially fed to the camera's reflector component.

It is known in the art to sequentially feed a plurality of flash lamps to a fixed reflector mounted on a camera. In most cases, the flash lamps and reflector constitute a singular device which is located atop the camera and operated in conjunction therewith. Examples include those shown in U.S. Letters Pat. Nos. 3,263,068 (F. Jakob), 3,452,660 (W. Schultz, et al.), and French Pat. No. 1,555,495 (M. Lambert). In each of these, it is required to provide an external device to accommodate both reflector and flash lamps due to the relatively large size and complexity of the lamp advancing mechanism. Understandably, this requirement adds appreciably to the cost of the camera. Furthermore, positioning and replacement of the flash lamp component (e.g. a film-like band with several electrically-fired lamps as shown in U.S. Pat. No. 3,263,068) proves both complicated and time-consuming.

Another method of sequentially firing flash lamps is shown in U.S. Pat. No. 3,238,749 (H. Reiber, et al.) wherein a longitudinal array of perpendicularly-oriented lamps is fed to a fixed reflector adapted for being mounted on a camera. Due to the requirement for an external reflector, this device possesses many of the disadvantages cited above. The assembly of U.S. Pat. No. 3,238,749 also presents a safety problem due to the exposure of the camera's operator to the hot, fired lamps. The only method suggested in this patent for advancing the assembly requires the camera's operator to grasp the assembly's base and manually index each lamp to the designated firing location. When using electrically-activated lamps, this presents another safety problem due to the possibility of the operator receiving an electrical shock.

It is believed therefore that a flash lamp assembly which overcomes the above disadvantages inherent in many prior art assemblies would constitute a significant advancement in the art.

OBJECT AND SUMMARY OF THE INVENTION

It is a primary object of the present invention to enhance the flash lamp art by providing an assembly which operates in a facile mannner, is relatively inexpensive to produce, and which does not present a safety problem to the operator of the camera using the assembly.

It will be understood from the following description that the unique design of the invention readily permits its use within a camera rather than requiring positioning thereof atop the camera body. Accordingly, only minor modifications to the designs of many of today's cameras are required to achieve this positioning. In most cases these modifications will include providing an internal reflector and a slot within the body in alignment with said reflector and having access thereto. For those cameras already having an internally positioned reflector, the number of required modifications to accommodate the invention will be even less.

According to one aspect of the invention, a flash lamp assembly is provided which is adapted for being operatively connected to a motion means (e.g. film advance mechanism) within a camera in order to permit sequential advancement of the assembly. The assembly includes a housing defining juxtapositioned chambers therein and which has a base portion and a light-transmitting cover portion adjacent thereto. Within each chamber is a flash lamp. An opening is provided within the housing adjacent each chamber and a heat-responsive cover member located thereover. The heat from the lamp physically deforms the cover member to thereafter permit the desired advancement of the assembly.

In accordance with another aspect of the invention a mechanism is provided for advancing a flash lamp assembly through a camera. The mechanism is operatively connected to the camera's motion means and includes means for sensing when heat responsive cover members on the assembly's housing become deformed, and means for engaging the housing to permit the desired advancement.

BRIEF DESCRIPTION OF THE DRAWINGS

FIGS. 4-6 depict a sequencing mechanism in accordance with a preferred embodiment of the invention, and the various steps in sequentially advancing a flash lamp assembly within a camera.

DETAILED DESCRIPTION OF THE PREFERRED EMBODIMENTS

For a better understanding of the present invention together with other and further objects, advantages and capabilities thereof, reference is made to the following disclosure and appended claims in connection with the above described drawings.

Figure 1:
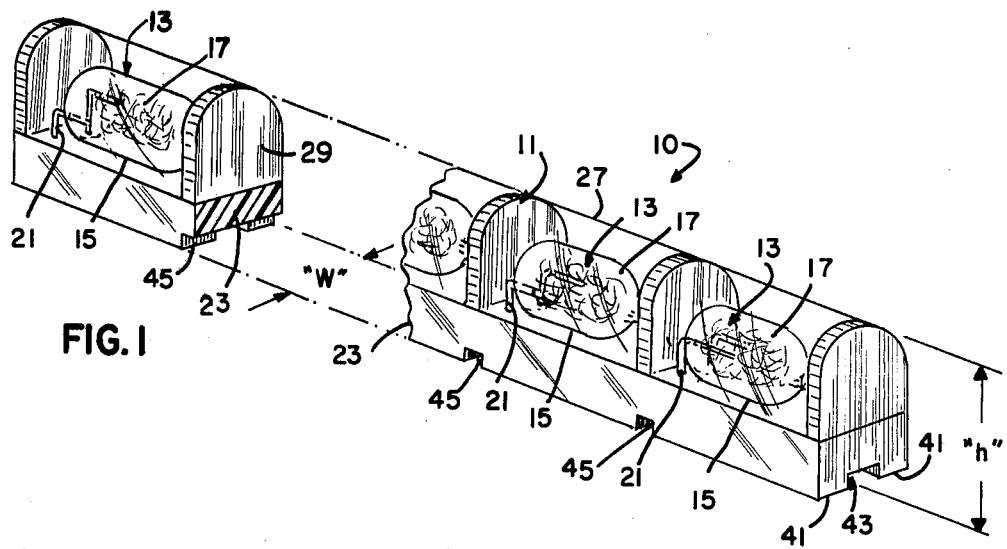
FIG. 1 is an isometric view of a flash lamp assembly in accordance with a preferred embodiment of the invention.
Figure 2:
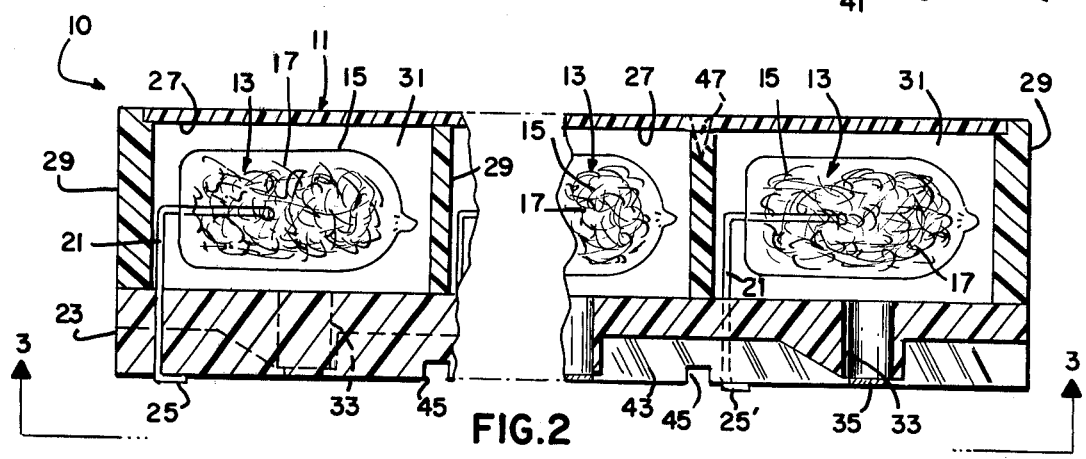
FIG. 2 is a side elevational view, in section, of the assembly of FIG. 1 as taken along the line 2—2 in FIG. 3.
Figure 3:
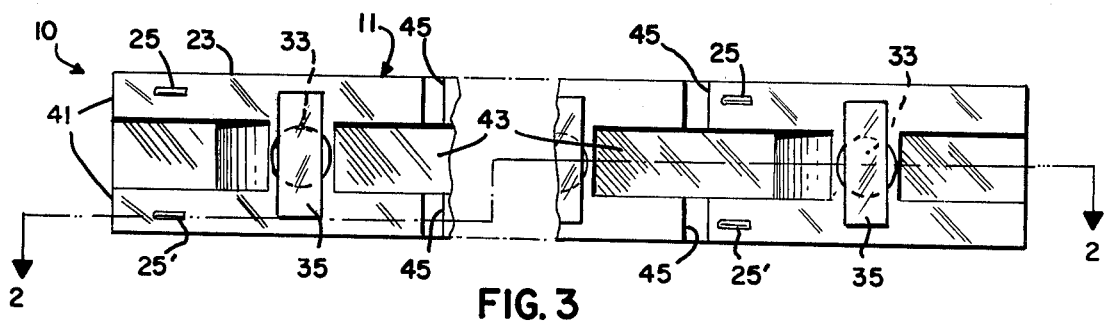
FIG. 3 is a bottom elevational view as taken along the line 3—3 in FIG. 2.

With particular reference to FIGS. 1-3, a flash lamp assembly 10 is shown as including an elongated housing 11 and a plurality (e.g. eight) of chemical flash lamps 13 within the housing. By a chemical flash lamp is meant one which includes a light-transmitting envelope 15, a combustion-supporting atmosphere within the envelope, and a quantity of filamentary combustible material 17 also within envelope 15. Lamps 13 may be electrically or percussively ignited, depending on the activating mechanism of the camera adapted for using assembly 10. In the preferred embodiment of the invention, lamps 13 are electrically-activated and include a pair of conductive leads 21 projecting from each envelope 15. Leads 21 are firmly positioned within an insulative, planar base portion 23 of housing 11 and pass therethrough to provide a pair of projecting ends 25 and 25' for each lamp. Accordingly, each lamp 13 will be electrically activated when a suitable potential is provided across each pair of leads 25 and 25'. In the event that lamps 13 are of the percussively ignitable variety as shown in U.S. Leters Pat. No. 3,535,063 (L. F. Anderson, et al.), the primer tube of the lamp would extend through base portion 23 and project therefrom. Activation of each lamp would thereafter be achieved by a suitable member capable of deforming the tube. Such a member is shown in U.S. Letters Pat. No. 3,597,604 (J. W. Shaffer) and comprises a helical torsion spring having a stressed striker arm capable of positively deforming a percussive lamp's primer tube. The described torsion spring could readily be mounted within the respective camera to provide the desired lamp activation. In either case, lamps 13 are oriented within housing 11 such that the longitudinal axis of each is parallel to the plane of the longitudinal housing's base 23. As shown in FIGS. 1 and 2, housing 11 further includes a light-transmitting cover portion 27 and a plurality of upstanding wall members 29. Housing 11 thus defines several chambers 31 therein which are oriented in a juxtapositioned relationship. Each chamber 31 serves to house the envelope 15 of one of the invention's flash lamps 13. Walls 29 are preferably opaque to prevent sympathetic ignition between lamps 13.

An opening 33 is provided within base portion 23 adjacent each chamber 31. Each opening 33 interconnects the respective chamber with the environment about base portion 23. Located over each opening 33 is a heat-responsive cover 35. As will be described, covers 35 become physically deformed by the heat emitted from the respective, adjacent lamp 13 to thereby permit the sequential advancement of assembly 10 through the associated camera 37 (shown in FIGS. 4-6). This heat passes through the opening 33 adjacent each envelope 15. The aforementioned sequential advancement thus permits the lamp in the chamber adjacent the fired lamp to now become aligned with the camera's internal reflector 39 (FIGS. 4-6).

Each cover member 35 is preferably of rectangular configuration and has a cross-sectional rectangular dimension of 0.12 by 0.27 inches. The round opening 33 adjacent each cover has a diameter of 0.125 inches. The overall length of assembly 10 is 5.82 inches, while the preferred height ("h") and width ("w") are 0.38 and 0.31 inches, respectively. Base 23, cover portion 27, and wall members 29, are comprised of plastic (styrene). The preferred thermally degradable material for covers 35 is biaxially oriented styrene. Other biaxially-oriented plastics, as well as many low melting point metal alloys, may also be used. Covers 35 are designed to physically deform (e.g. melt) at a temperature within the range of from about 70° to about 150 degrees Celsius.

Base portion 23 is shown in FIGS. 1-3 as including a pair of opposing, upstanding parallel sides 41 which define a longitudinal channel 43 therebetween. Channel 43 is provided to facilitate positioning and movement of housing 11. Accordingly, an upstanding rib or similar member within the corresponding slot in the camera may be aligned within channel 43. Each opening 33 is located within channel 43 such that the cover members 35 transverse the channel and are secured (e.g. glued) to sides 41. In FIG. 3, it can be seen that the projecting ends 25 and 25' of leads 21 are each located on a respective side 41 with channel 43 providing suitable spacing therebetween.

Base portion 23 of housing 11 is also shown in FIGS. 1-3 as having a plurality of recesses 45 each of which is located adjacent a respective chamber 31. Recesses 45 facilitate the indexing of assembly 10 by providing a receiving location for the preferred advancing mechanism for the invention. In actuality, each recess 45 is in two parts with each part located opposite the other in one of the sides 41.

In FIG. 2, one of the walls 29 is shown as including a notch 47. This indentation may be provided opposite a corresponding recess 45 to provide a means whereby each of the chamber portions of housing 11 may be separated from the remainder of the assembly. Actually, several notches 47 would be provided (one opposite each recess) whereby the camera's operator could manually "break-off" one of the lamps as each emerged from the camera body. In the broader aspects of the invention, it is understood that notch 47 could be located at some other position such as within cover 27 immediately adjacent wall 29. Furthermore, notch 47 could be located about the entire periphery of housing 11.

In FIGS. 4-6, there are shown the steps in sequentially advancing flash lamp assembly 10 through a slot 49 within camera 37 in order that each flash lamp 13 will become aligned with an internal reflector 39. Understandably, the reflector must include apertures therein to accommodate elongated housing 11. The housing will thus pass through slot 49 such that each lamp is oriented substantially within the reflector's confines.

In FIG. 4, assembly 10 is illustrated as being initially inserted within slot 49 such that the first lamp 13 (to the right) is aligned within reflector 39. Electrical connection is made between the camera's power source (e.g. piezoelectric crystal, battery, etc.) and the projecting ends 25 (and 25') of leads 21 by a pair (one shown) of resilient contacts 51 which extend within slot 49 and engage ends 25 (and 25') to provide this interconnection. The camera's operator activates the camera to take a photograph by depressing or sliding the camera's trigger switch (not shown). If the power source and respective lamp are electrically connected, the lamp will be fired (FIG. 5). It should be added that this connection may be readily broken by provision of a selector switch (also not shown) between contacts 51 and the source. The operator may then selectively decide whether or not a flash lamp will be utilized.

Subsequent to the firing of the lamp 13 within reflector 39, assembly 10 is sequentially advanced within slot 49 by advancing mechanism 53. Mechanism 53 comprises a sensing means 55 for sensing when the cover member 35 for each lamp 13 has been physically deformed. Means 55 comprises an elongated bar having a tip portion 57 which rests upon the cover member 35 and thereafter occupies the opening thereunder when member 35 deforms. Bar 55 is pivotally mounted at end 59, which slides within a channel 61 within camera 37.

When bar 55 has sensed deformation of cover member 35, an engagement means 63 of mechanism 53 engages housing 11 to thereafter permit the advancement of the next lamp toward reflector 39 (FIG. 6). Means 63 is preferably an elongated rod having a protruding end 65 which engages the recess 45 adjacent the fired lamp. Like bar 55, rod 63 has a pivotal end 67 which is slidably positioned within a second groove or channel 61' within camera 37. Means 55 and 63 are preferably operatively connected at location 69 to enhance the above advancement. Furthermore, means 63 is operatively joined to a motion means 71 typically associated with camera 37. Motion means 71 may include the camera's shutter mechanism, shutter recocking device, film advancing mechanism, or exposure termination mechanism. In either event, the advancing mechanism of the present invention is fully adaptable to being joined to any of the above.

Thus there has been shown and described a flash lamp assembly which is easy to operate, inexpensive to produce, and which is readily adaptable to many of today's camera's provided minor modifications are made thereto. There has also been shown and described a unique advancing mechanism capable of providing the desired sequential movement of the assembly within a respective camera.

While there have been shown and described what are at present considered the preferred embodiments of the invention, it will be obvious to those skilled in the art that various changes and modifications may be made therein without departing from the scope of the invention as defined by the appended claims.

What is claimed is:

1. A flash lamp assembly for use with a photographic camera having a fixed reflector and a motion means therein adapted for sequentially moving within said camera, said flash lamp assembly comprising:
    an elongated housing adapted for being operatively connected to said motion means and for being sequentially advanced within said camera, said housing defining a plurality of juxtapositioned chambers therein and including a base portion and a light-transmitting cover portion adjacent said base portion, said base portion including a plurality of openings therein each located adjacent a respective one of said juxtapositioned chambers and having access thereto;
    a plurality of chemical flash lamps positioned within said base portion of said housing and adapted for being aligned with said fixed reflector as said elongated housing is sequentially advanced within said housing, each of said flash lamps including a light-transmitting envelope located within a respective one of said chambers; and
    a plurality of heat-responsive cover members each positioned on said base portion over a respective one of said openings within said housing, each of said cover members becoming physically deformed in response to receipt of the heat from the flash lamp located within said chamber adjacent said opening when said flash lamp is activated to permit said sequential advancement of said housing within said camera whereby the flash lamp adjacent said activated flash lamp will become aligned with said fixed reflector.

2. The flash lamp assembly according to claim 1 wherein each of said flash lamps is electrically-activated and includes a pair of conductive leads projecting from said light-transmitting envelope and passing through said base portion of said housing.

3. The flash lamp assembly according to claim 2 wherein the number of said electrically-activated flash lamps is eight.

4. The flash lamp assembly according to claim 2 wherein said base portion of said housing includes a pair of substantially parallel upstanding sides which define a longitudinal channel therebetween, each of said openings within said base portion of said housing located within said longitudinal channel.

5. The flash lamp assembly according to claim 4 wherein each of said upstanding sides of said base portion includes a recess therein adjacent a respective one of said chambers.

6. The flash lamp assembly according to claim 4 wherein each of said conductive leads passes through a respective one of said upstanding sides of said base portion.

7. The flash lamp assembly according to claim 4 wherein each of said cover members transverses said longitudinal channel and is secured to each of said upstanding sides.

8. The flash lamp assembly according to claim 1 wherein each of the portions of said housing which define a respective one of said chambers is separable from the remainder of said housing.

9. The flash lamp assembly according to claim 1 wherein each of said heat-responsive cover members is comprised of biaxially oriented styrene.

10. The flash lamp assembly according to claim 1 wherein each of said light-transmitting envelopes of said flash lamp is substantially parallel to the plane of said base portion of said housing.

11. For use within a photographic camera having a fixed reflector and motion means adapted for sequentially moving within said camera, a mechanism for advancing a flash lamp assembly within said camera to sequentially align component flash lamps of said flash lamp assembly with said fixed reflector, said flash lamps assembly including a housing having said flash lamps located therein, a plurality of openings each positioned within said housing adjacent a respective one of said flash lamps, and a plurality of heat-responsive cover members each located over a respective one of said openings for becoming physically deformed in response to receipt of the heat from the flash lamp adjacent said opening as said flash lamp is activated, said advancing mechanism comprising:
    sensing means for sensing when each of said heat-response cover members becomes physically deformed; and
    engagement means for engaging said housing only when said sensing means senses said physical deformation to permit said advancement of said flash lamp assembly, said engagement means operatively connected to said motion means.

12. The advancing mechanism according to claim 11 wherein said sensing means and said engagement means are operatively connected.

13. The advancing mechanism according to claim 11 wherein said sensing means comprises an elongated bar member having a tip portion for engaging each of said heat-responsive members and for occupying said openings adjacent said heat-responsive members subsequent to said physical deformation thereof.

14. The advancing mechanism according to claim 13 wherein said elongated bar includes a pivotal end portion and is slidably oriented within said camera.

15. The advancing mechanism according to claim 11 wherein said engagement means comprises an elongated rod having an end portion for engaging a recess within said housing.

16. The advancing mechanism according to claim 15 wherein said elongated rod includes a pivotal second end portion, said second end portion slidably positioned within said camera.

* * * * *